United States Patent [19]

Roscoe et al.

[11] Patent Number: 5,055,676

[45] Date of Patent: * Oct. 8, 1991

[54] METHOD FOR DETERMINING OIL AND WATER SATURATION IN EARTH FORMATION SURROUNDING A BOREHOLE

[75] Inventors: Bradley A. Roscoe, Pasadena; Christian Stoller, Kingwood, both of Tex.

[73] Assignee: Schlumberger Technology Corporation, Houston, Tex.

[*] Notice: The portion of the term of this patent subsequent to Sep. 3, 2008 has been disclaimed.

[21] Appl. No.: 521,804

[22] Filed: May 9, 1990

[51] Int. Cl.$^5$ ............................................. G01V 5/00
[52] U.S. Cl. .................................. 250/270; 250/264; 250/265; 250/266
[58] Field of Search ...................... 376/166, 160, 161; 250/270, 266, 265, 264, 262

[56] References Cited

U.S. PATENT DOCUMENTS 3,849,646 11/1974 McKinlay et al. ................. 250/270
4,380,701 4/1983 Smith, Jr. et al. ................. 250/270

FOREIGN PATENT DOCUMENTS 0206593 12/1986 European Pat. Off. .
2012419 7/1979 United Kingdom .

Primary Examiner—Carolyn E. Fields
Assistant Examiner—James E. Beyer
Attorney, Agent, or Firm—Henry N. Garrana; Frederic C. Wagret

[57] ABSTRACT

A method and an apparatus for determining the hydrocarbon saturation $S_o$ in an earth formation surrounding a borehole, and/or the hydrocarbon saturation $C_b$ in said borehole, comprising:

irradiating the formation with a source of neutrons of sufficient energy to interact with atoms of the formation and the borehole, according to inelastic neutron reactions; detecting the resulting gamma rays at a near detector and a far detector; expressing the measured carbon (C) and oxygen (O) yields respectively as a first and second linear function of $S_o$, $S_w$ the water saturation in the formation, $C_b$ and/or $C_o$ water saturation in the borehole; combining the respective carbon and oxygen yields ($C^n$, $O^n$) for the near detector, and the respective carbon and oxygen yields ($C^f$, $O^f$) for the far detector so as to form the differences $C^n-O^n$ and $C^f-O^f$; and solving for the unknowns $S_o$ and $C_b$.

Alternately, in case either $S_o$ or $C_b$ is known from another source, one can use a single detector.

38 Claims, 2 Drawing Sheets

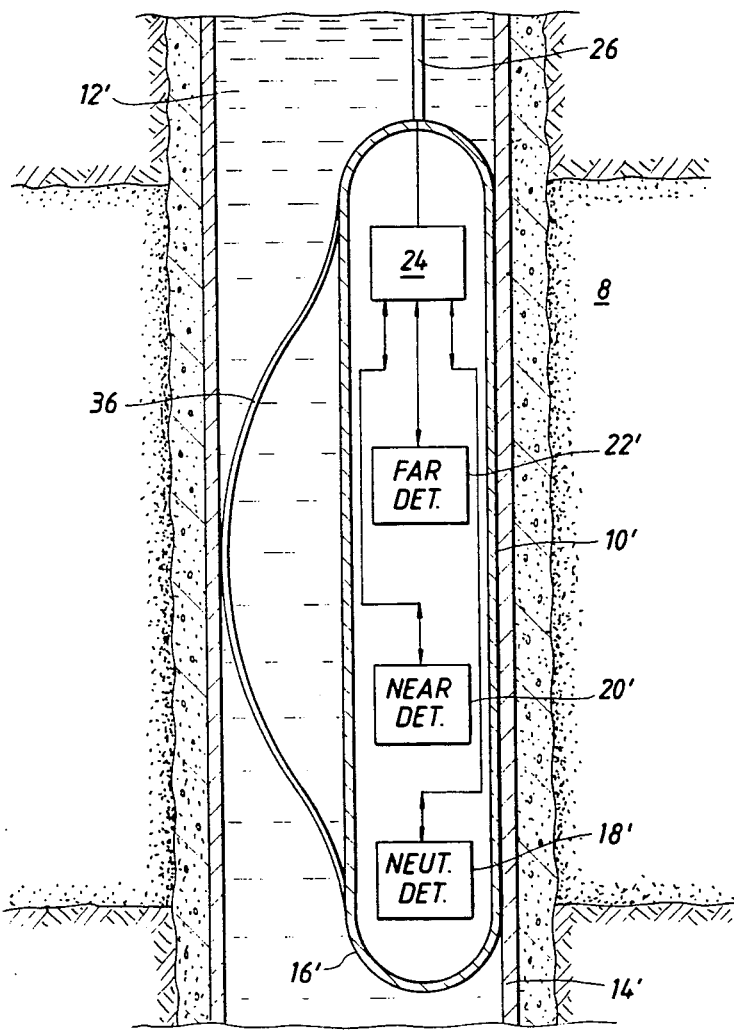
FIG.2
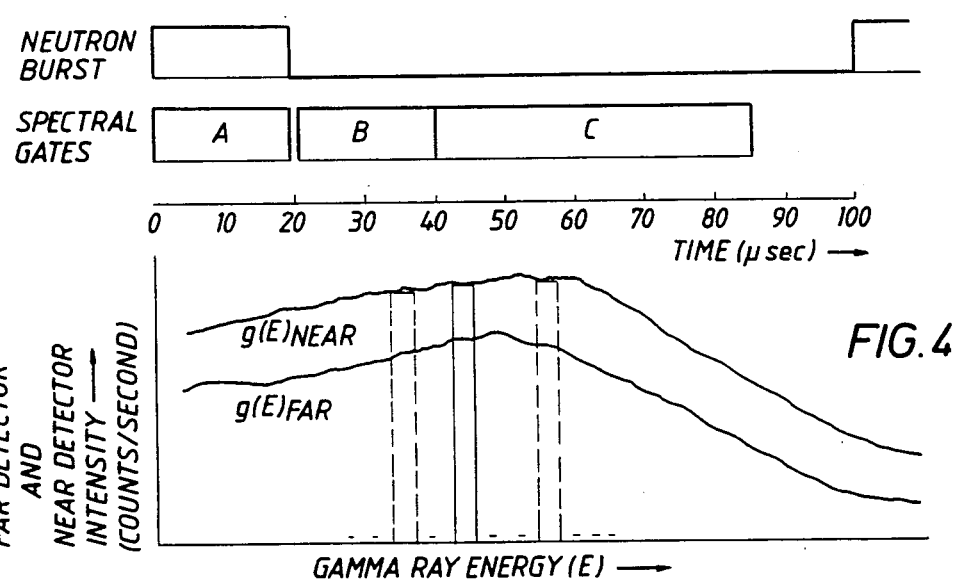
FIG.3
FIG.4

METHOD FOR DETERMINING OIL AND WATER SATURATION IN EARTH FORMATION SURROUNDING A BOREHOLE

BACKGROUND OF THE INVENTION

1. Field of the Invention

This invention relates to nuclear well logging method for determining the nature of fluids in formations through which a borehole is formed as well as the nature of fluids in the borehole. More particularly, the invention relates to determining the hydrocarbon saturation (or its correlative, water saturation) of formations adjacent a borehole by nuclear radiation logging. Still more particularly, the invention relates to inelastic gamma ray spectrum logging of a formation with correction for gamma rays from borehole fluids.

2. Related Art

A major goal of well logging is to establish the fraction of pore space in the earth formation occupied by hydrocarbons. Three methods of doing so have been developed in the prior art. The first two methods are electrical resistivity and thermal neutron decay methods which measure the water saturation $S_w$, and the difference, $S_o = 1 - S_w$, is the saturation of all other liquids and gases. The term $S_o$, or "oil" saturation, will be used hereafter to refer not only to liquid hydrocarbons, but also to gas. Both the electrical resistivity and thermal neutron decay methods depend upon the presence of salts dissolved in the water and, for that reason, are less effective in fresh water than in salt water environments.

The third known method is based on the fact that hydrocarbons contain carbon and water contains oxygen. When a high energy neutron, usually called "fast neutron", is scattered inelastically from a carbon atom, a 4.4 MeV gamma ray is emitted. When a fast neutron is scattered from an oxygen atom, a 6.1 MeV gamma ray is emitted among others. Therefore, a logging apparatus which counts the number of 4.4 MeV gamma rays and the number of 6.1 MeV gamma rays and determines their ratio should be, under ideal conditions, able to provide a measure of the ratio of carbon to oxygen in the formation. Such measurements are known in the art as carbon/oxygen or simply, C/O measurements or C/O logs. Moreover, a calcium/silicon ratio can also be obtained. Comparison of these two ratios permits the user to distinguish carbon in calcium carbonates from that in hydrocarbons.

In cased hole wells, where the salinity or salt content of a water-saturated zone is not known, is very low, or has been altered by production by water injection, the C/O measurement is the only alternative to resistivity and neutron decay methods.

Under actual field conditions, however, the well bore may contain hydrocarbons (in the form of oil or gas) and water. Consequently, C/O measurements of the formation are contaminated or "corrupted" with gamma rays resulting from fast neutron interaction with carbon and oxygen atoms of fluids in the borehole. In addition, lithologies, such as dolomite and limestone, contain carbon atoms. Such contamination of the inelastic gamma ray spectral data, and ultimately of the $S_o$ determination, may be eliminated if the porosity, lithology, borehole configuration and hydrocarbon content of the fluid in the well bore is known.

Characteristics as a function of depth of a cased well, such as porosity and lithology of the formation and the borehole configuration may be known. But C/O logging has been highly sensitive to uncertainty of the borehole oil/water mixture. For this reason C/O logging measurements of cased, producing wells have required that the well be "shut-in" so that the borehole fluid components may be known better. However, even with shut-in wells, the content of borehole fluid is not always known well enough.

As described in U.S. pending application Ser. No. 07/203,397 filed on June 7, 1988 in the name of McKeon, Roscoe, Stoller, and assigned to Schlumberger Technology Corporation, the C/O measurements are carried out by using a logging tool provided with a near and a far detector. The relative amounts of carbon and oxygen $C^n$, $O^n$ as measured from the near detector and the relative amounts of carbon and oxygen $C^f$, $O^f$, as measured from the far detector, are obtained. At least squares analysis is performed to determine $C^n$, $O^n$ from the energy spectrum (counts versus energy) acquired from the near detector, using standard spectra for the near detector, $C^f$ and $O^f$ are determined from the energy spectrum as measured from the far detector using standard spectra for the far detector. The analysis is performed at successive logging depth in the borehole. Next, the carbon and oxygen determinations of the near and far detectors are combined to determine oil saturation of the formation ($S_o$) and/or the oil percentage in the borehole ($C_b$). This is done by assuming that the total carbon and oxygen measured as indicated above are equal to the sum of the carbon and oxygen yields from the rock matrix of the formation, the pore space fluid, and the borehole fluid:

$$C = C_{mat} + C_{por} + C_{bh} \qquad (1)$$

$$O = O_{mat} + O_{por} + O_{bh} \qquad (2)$$

where "C" and "O" are the carbon and oxygen yields (as measured) and the subscripts stand respectively for "matrix", "pore space", and "borehole". The term "yield" refers here to the number of gamma ray counts coming from a specific element. As known from the US pending patent application referred to, equations (1) and (2) may be expressed as a function of $S_o$ (oil saturation in the formation, or percentage of oil in the pore space) and $C_b$ (the percentage of oil in the borehole):

$$C_{meas} = \alpha + \beta S_o + \delta C_b \qquad (3)$$

$$O_{meas} = \eta + \mu S_o + \nu C_b \qquad (4)$$

The coefficients $\alpha$, $\beta$, $\delta$, $\eta$, $\mu$ and $\nu$ are then determined under laboratory conditions by taking four measurements under the same conditions except varying $S_o$ and $C_b$. For example, the conditions of a 10 inch borehole, a 7"(17.8 cm)-23 lb per foot (15.5 kg/m) casing in a 33 p.u. (porosity unit) sandstone formation may be established, for calibration, and then C and O from near and far detectors may be measured with the logging tool to be used in the field. The table below illustrates the laboratory measurements:

| CONDITION | BOREHOLE | FORMATION | MEASURE |
|---|---|---|---|
| | water | water | $C^n$, $O^n$ |
| | | | $C^f$, $O^f$ |
| | water | oil | $C^n$, $O^n$ |
| | | | $C^f$, $O^f$ |
| | oil | water | $C^n$, $O^n$ |

-continued

| BOREHOLE | FORMATION | MEASURE |
|---|---|---|
| | | $C^f, O^f$ |
| oil | oil | $C^n, O^n$ |
| | | $C^f, O^f$ |

The superscripts "n" and "f" refer respectively to the near and far detector.

These four measurements with three unknowns are for near and far carbon and oxygen. Since the equations (3) and (4) are over determined, the coefficients $\alpha$, $\beta$, $\delta$, $\eta$, $\mu$, and $\nu$, for both the near and far measurements, are obtained using conventional least squares procedures.

Next, a carbon/oxygen ratio is formed for each of the near and far detectors, i.e. $C^n/O^n$ and $C^f/O^f$, leading to two equations which are solved for $S_o$ and $C_b$.

At each depth in the borehole, a signal representative of oil saturation $S_o$, and water saturation $S_w = 1 - S_o$, and percentage oil in the borehole $C_b$, is recorded.

Although the above referred known method represents a substantial improvement one could increase the benefit from the use of two different detectors by more efficiently combining or correlating measurements from respective detectors. Furthermore, the determination of the $\alpha$, $\beta$, $\delta$, $\eta$, $\mu$ and $\nu$ coefficients could be improved.

Consequently, while the known technology above described represents efforts to advance the nuclear logging art, the need remains for a method and apparatus by which the oil saturation in the formation ($S_o$) and/or in the borehole fluid ($C_b$) may be more accurately determined through C/O logging techniques with correction for corrupting gamma rays of unknown amounts of hydrocarbons in the borehole.

OBJECTS OF THE INVENTION

A principal object of this invention is to provide a C/O logging method where carbon and oxygen measurements at near and far detectors are fully combined or correlated to produce a representation of oil saturation of the formation, and are corrected for the gamma rays produced by carbon and oxygen atoms in the borehole.

It is a first particular object of the invention to provide the determination of the oil saturation in the formation $S_o$.

It is a second particular object of the invention to determine the oil percentage in the borehole fluid $C_b$.

It is a third particular object of the invention to enhance the accuracy of the determination process of the coefficients representative of the environmental effects.

It is a fourth particular object of this invention to simultaneously determine $S_o$ and $C_b$.

SUMMARY OF THE INVENTION

According to the invention, these and further objects are attained by a method for determining the hydrocarbon saturation $S_o$ in an earth formation surrounding a borehole, comprising:

irradiating the formation with a source of neutrons of sufficient energy to interact with atoms of the formation and the borehole, according to inelastic neutron reactions;

detecting and counting the gamma rays resulting from said reaction at at least one location longitudinally spaced from said source;

expressing the measured carbon (C) and oxygen (O) yields respectively as a first and second linear function of $S_o$, $S_w$ the water saturation in the formation, $C_b$ the hydrocarbon saturation in the borehole, and/or $C_o$ the water saturation in the borehole;

combining the respective measured carbon and oxygen yields (C, O) so as to form the difference $C - O$; and solving for the unknown $S_o$.

Alternately, the invention is directed to the determination of the hydrocarbon saturation $C_b$, while $S_o$ is known from another source.

In a further embodiment, the invention deals with a method for the simultaneous determination of $C_b$ and $S_o$, comprising:

irradiating the formation with a source of neutrons of sufficient energy to interact with atoms of the formation and the borehole, according to inelastic neutron reactions;

detecting and counting the gamma rays resulting from said reactions, at at least two locations longitudinally spaced from said source and including a first location and at a second location, said first location (near) being disposed a distance from said source smaller than said second location (far);

expressing the measured carbon (C) and oxygen (O) yields respectively as a first and second linear function of $S_o$, $S_w$ the water saturation in the formation, $C_b$, and/or $C_o$ water saturation in the borehole;

combining the respective carbon and oxygen yields ($C^n$, $O^n$) for the near detector, and the respective carbon and oxygen yields ($C^f$, $O^f$) for the far detector so as to form the differences $C^n - O^n$ and $C^f - O^f$; and solving for the unknowns $S_o$ and $C_b$.

The differences $C^n - O^n$ and $C^f - O^f$ are expressed as $$C^n - O^n = (F_{kc}^n - F_{ko}^n - F_{of}^n - F_{ob}^n) + (F_{cf}^n + F_{of}^n)S_o + (F_{cb}^n + F_{ob}^n)C_b$$

$$C^f - O^f = (F_{kc}^f - F_{ko}^f - F_{of}^f - F_{ob}^f) + (F_{cf}^f + F_{of}^f)S_o + (F_{cb}^f + F_{ob}^f)C_b$$

where "$F_{xy}^n$" and "$F_{xy}^f$" are coefficients representative of the environmental effects, and superscripts "n" and "f" respectively refer to the near and the far detecting locations.

Alternately, the differences are expressed as $$C^n - O^n = (\alpha_n - \eta_n) + (\beta_n - \mu_n)S_o + (\delta_n - \nu_n)C_b$$

$$C^f - O^f = (\alpha_f - \eta_f) + (\beta_f - \mu_f)S_o + (\delta_f - \nu_f)C_b$$

where "$\alpha_n$, $\eta_n$, $\beta_n$, $\mu_n$, $\delta_n$, $\nu_n$, $\alpha_f$, $\eta_f$, $\beta_f$, $\mu_f$, $\delta_f$, and $\nu_f$" are coefficients representative of the environmental effects, the subscripts "n" and "f" respectively referring to the near and the far detecting locations.

In one embodiment, the first linear function is of the form $$C = F_{kc} + F_{cf}S_o + F_{cb}C_b$$

and the second linear function is of the form $$O = F_{ko} + F_{of}S_w + F_{ob}C_o$$

where "$F_{xy}$" are coefficients representative of the environmental effects, subscript "k" refer to constant, "c" to carbon, "o" to oxygen, "f" to the formation and "b" to the borehole.

According to another feature of the invention, the method comprises:

expressing each of the measured carbon and oxygen yields (C, O) in the following matrix form:

$$[U] = [S][y]$$

where [U] is a $2N \times 1$ matrix made of the number of counts detected in each channel or energy window, respectively for the near and the far detector, "N" being the number of channel; [S] is a $2N \times 2n$ matrix including the standards for carbon and oxygen, "n" being the number of elements under investigation able to react with said neutrons, and [y] is a $2n \times 1$ matrix comprising the element yields including the carbon ($y_c$) and oxygen ($y_o$) yields;

expressing the carbon and/or oxygen yields as respective functions of $S_o$ and $C_b$; and solving for the unknown $S_o$.

A similar method can be used for the determination of the hydrocarbon saturation $C_b$ in a borehole, comprising:

irradiating the formation with a source of neutrons of sufficient energy to interact with atoms of the formation or the borehole, according to inelastic neutron reactions;

detecting and counting the gamma rays resulting from said reactions at at least one detecting location longitudinally spaced from said source;

expressing each of the measured carbon and oxygen yields (C, O) in the following matrix form:

$$[U] = [S][y]$$

where [U] is a $2N \times 1$ matrix made of the number of counts detected in each channel or energy window, "N" being the number of channel; [S] is a $2N \times 2n$ matrix including the standards for carbon and oxygen, "n" being the number of elements under investigation able to react with said neutrons, and [y] is a $2n \times 1$ matrix comprising the element yields including the carbon ($y_c$) and oxygen ($y_o$) yields;

expressing the carbon and/or oxygen yields as respective functions of $S_o$ and $C_b$; and solving for the unknown $C_b$.

A variant method is directed to the determination of both $S_o$ and $C_b$, and comprises:

irradiating the formation with a source of neutrons of sufficient energy to interact with atoms of the formation or the borehole, according to inelastic neutron reactions;

detecting and counting the gamma rays resulting from said reactions at at least two detecting locations including a first and a second location, said first location (near) being disposed longitudinally closer from said source than said second location (far);

expressing each of the measured carbon and oxygen yields (C, O) in the following matrix form:

$$[U] = [S][y]$$

where [U] is a $2N \times 1$ matrix made of the number of counts detected in each channel or energy window, respectively for the near and the far detector, "N" being the number of channel; [S] is a $2N \times 2n$ matrix including the standards for carbon and oxygen, for the near and far detector, "n" being the number of elements under investigation able to react with said neutrons, and [y] is a $2n \times 1$ matrix comprising the element yields including the carbon ($y_{cn}$, $y_{cf}$) and oxygen ($y_{on}$, $y_{of}$) yields;

expressing the carbon and/or oxygen yields as respective functions of $S_o$ and $C_b$; and solving for the unknowns $S_o$ and $C_b$.

More precisely, the method includes:

expressing said equation $[U] = [S][y]$ as $$[U] - [F_{kc}S_c] = [S_{mod}][y_{mod}]$$

where $[F_{kc}S_c]$ is a matrix composed of near and far detector standard $[S_{cn}]$ and $[S_{cf}]$ which represent the constant carbon contribution which is not due to the borehole fluid or the fluid present in the formation, $$[F_{kc}S_c] = F_{kc}{}^n[S_{cn}] + F_{kc}{}^f[S_{cf}]$$

where subscript "n" and "f" refer respectively to near and far detecting location, $[S_{mod}]$ being a matrix including near and far standards (not including carbon) and which is written as a function of $S_o$ and $C_b$ by changing the variables in the standard matrix [S] from the carbon yields $y_{cn}$, $y_{cf}$ to $S_o$ and $C_b$, and wherein $[S_{mod}]$ matrix includes a first standard or variable function $[S_{1,mod}]$ corresponding to $C_b$ and a second standard or variable function $[S_{2,mod}]$ corresponding to $S_o$, $$[S_{1,mod}] = F_{cb}{}^n[S_{cn}] + F_{cb}{}^f[S_{cf}]$$

where $[S_{cn}]$ denotes a matrix including the carbon standard for the near detector and $[S_{cf}]$ is a matrix including the carbon standard for the far detector, $$[S_{2,mod}] = F_{cf}{}^n[S_{cn}] + F_{cf}{}^f[S_{cf}];$$

and repeating the above steps for oxygen.

Alternately, the method further includes:

expressing said equation $[U] = [S][y]$ as $$[U] - [\alpha S_o] = [S_{mod}][y_{mod}]$$

where $[\alpha S_o]$ is a matrix composed of near and far detectors and representing the constant carbon contribution which is not due to the borehole fluid or the fluid present in the formation, and being expressed as $$[\alpha S_o] = \alpha_n[S_{cn}] + \alpha_f[S_{cf}]$$

$[y_{mod}]$ is a $2n \times 1$ matrix including the carbon/oxygen yields, and $[S_{mod}]$ is a matrix including near and far standards (not including carbon) and which is written as a function of $S_o$ and $C_b$ by changing the variables in the standard matrix [S] from $y_{cn}$ and $y_{cf}$ to $S_o$ and $C_b$; wherein $[S_{mod}]$ matrix includes a first standard or variable function $[S_{1,mod}]$ corresponding to $C_b$ and a second standard or variable function $[S_{2,mod}]$ corresponding to $S_o$, said first standard $[S_{1,mod}]$ is expressed as $$[S_{1,mod}] = \delta_n[S_{cn}] + \delta_f[S_{cf}]$$

where $[S_{cn}]$ denotes a matrix including the carbon standard for the near detector and $[S_{cf}]$ is a matrix including the carbon standard for the far detector; said second variable function $[S_{2,mod}]$ is expressed as $$[S_{2,mod}] = \beta_n[S_{cn}] + \beta_f[S_{cf}];$$

and repeating the above steps for oxygen.

The invention also deals with a method for determining the hydrocarbon saturation $S_o$ in an earth formation surrounding a borehole, comprising expressing the measured carbon (C) and oxygen (O) yields respectively as a first and second linear function of two or more of the following parameters: $S_o$, $S_w$ the water saturation in the formation, $C_b$ the hydrocarbon saturation in the borehole, and/or $C_o$ the water saturation in the borehole.

The invention further contemplates an apparatus for determining the hydrocarbon saturation $S_o$ in an earth formation surrounding a borehole, comprising:

means for irradiating the formation with a source of neutrons of sufficient energy to interact with atoms of the formation and the borehole, according to inelastic neutron reactions;

means for detecting and counting the gamma rays resulting from said reactions at at least one location longitudinally spaced from said source;

means for expressing the measured carbon (C) and oxygen (O) yields respectively as a first and second linear function of $S_o$, $S_w$ the water saturation in the formation, $C_b$ the hydrocarbon saturation in the borehole, and/or $C_o$ the water saturation in the borehole;

means for combining the respective measured carbon and oxygen yields (C, O) so as to form the difference C−O; and means for solving for the unknown $S_o$.

The characteristics and advantages of the invention will appear better from the description to follow, given by way of a nonlimiting example, with reference to the appended drawings in which:

BRIEF DESCRIPTION OF THE DRAWINGS

FIG. 2 is an alternative embodiment of the tool for use in large diameter tubing;

FIG. 3 illustrates timing schedules for neutron bursts and counting gates; and

FIG. 4 is an illustration of gamma ray count spectra obtained by near and far detectors.

DESCRIPTION OF THE INVENTION

Figure 1:
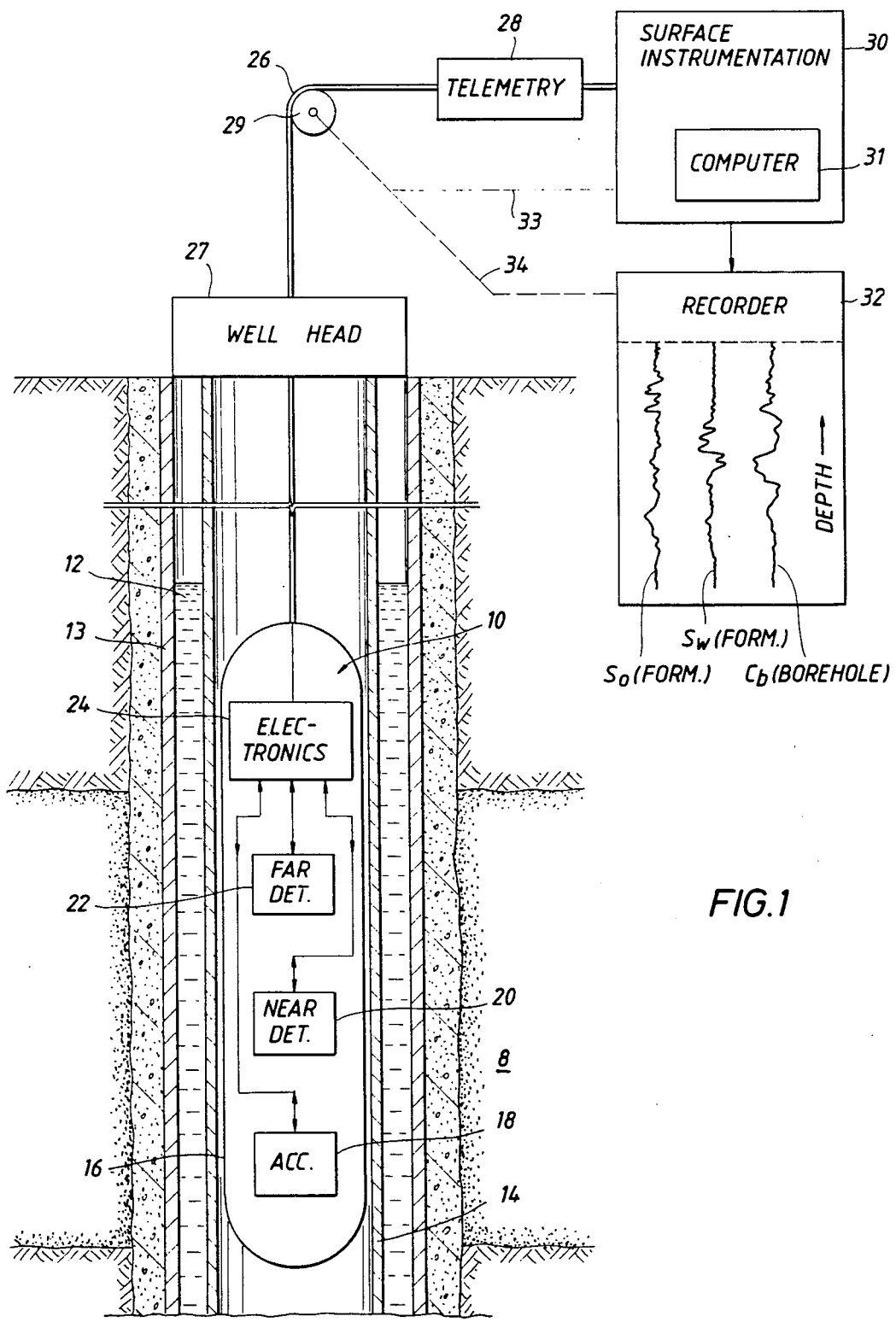
FIG. 1 is a schematic illustration of a through tubing version of a well logging tool within a borehole.

FIG. 1 schematically illustrates logging sonde 10 in a well bore 12 during logging operations. The sonde 10 includes a housing 16 in the shape of a cylindrical sleeve, which is designed for running through either small or large diameter production tubing. Although not illustrated in FIG. 1, the small diameter sonde 10 may also have an eccentering device, such as the one shown and referred as 36 in FIG. 2, for forcing the tool against well casing beneath the bottom end of tubing 14. Accelerator or pulsed neutron source 18 is mounted in the sonde with near detector 20 and far detector 22 mounted longitudinally above accelerator 18, with increasing axial distances. Acquisition, control and telemetry electronics 24 are shown schematically and will be described in more detail below. Electronics 24 serves among other functions, to control the timing of burst cycles of the neutron accelerator 18 the timing of detection time gates for near and far detectors 20, 22, and to telemeter count rate and other data via cable 26 and telemetry circuitry 28 to surface instrumentation 30 which includes computer 31. Computer 31 receives gamma ray spectral data from near and far detectors 20, 22 and processes and combines it according to the method of this invention to produce a signal representative of formation hydrocarbon (hereafter simply "oil") saturation $S_o$. The signal may be recorded as a function of depth on recorder 32 along with a signal representative of the percentage of oil in the borehole fluid, $C_b$. Water saturation $S_w$ may also be recorded.

The schematic illustration of FIG. 1 shows application of the invention through tubing 14 in the well bore 12 which typically is lined with steel casing 13 and cemented in place through formations 8. Well head 27 at the earth's surface communicates with tubing 14. Sheave wheel 29 is shown schematically as controlling the movement of sonde 10 through tubing 14. The depth of the sonde 10 within well bore 12 is measured by encoders associated with sheave 29 as indicated by dotted lines 33, 34 from sheave 29 to computer 30 and recorder 32.

FIG. 2 illustrates an alternative sonde 10' disposed in a well bore 12' which may be an open hole but is more likely a cased hole beneath production tubing. Sonde 10' includes an eccentering device such as bow spring 36 forcing housing 16' against the wall of the casing or bore of the well. The through tubing sonde 10', like the through tubing sonde 10 of FIG. 1, has a neutron accelerator 18' and progressively spaced apart near and far detectors 20' and 22'. The outside diameter of sonde 10' is preferably 2½ inches.

The neutron accelerator 18 or 18' is operated to provide a burst of fast neutrons periodically, such that, e.g., 20 microsecond neutron bursts occur in a 100 microsecond cycle time, as illustrated in FIG. 3. The first time gate A, substantially coinciding with the neutron burst, is used to detect inelastic gamma rays produced by the fast neutrons, while the two other following time gates B and C may be used to detect gamma rays produced as the neutrons slow down to thermal energy and are captured by the nuclei of elements of formation or borehole.

FIG. 4 depicts the inelastic energy spectra of gamma ray counts as detected by near and far detectors 20 and 22 during time gate A. The inelastic energy spectra (and capture spectra from gates B and C) are obtained by accumulating the gate counts-per-channel signals from near and far detectors for a period long enough to give a statistically satisfactory spectrum, e.g., on the order of 20 seconds for the timing sequence of FIG. 3. This is done under control of surface instrumentation 30 to output spectra as depicted for example in FIG. 4. The surface instrumentation 30 is then reset to zero, and new channel count data for spectra for a new depth in the well bore 12 are accumulated.

Two gamma ray count functions, referred to as g(E)-$_{near}$ and g(E)$_{far}$ on FIG. 4, are obtained at each depth of the borehole of sonde 16 from surface instrumentation 30 after receipt of gamma ray count and pulse height information from circuitry 24. The method of the invention includes determining for each detector measured amounts of elements of the formation and borehole from a composite spectrum made up of weighted standard spectra of the constituents postulated to comprise the formation and the borehole. As described in U.S. Pat. No. 3,521,064 issued July 21, 1970 to Moran and Tittman, the fraction of standard spectra which give the best fit of the composite spectrum to the unknown spectrum represent the relative proportions of the constituents in the formation and borehole. By appropriate selection of the standards, the proportions of the earth constituents of interest, such as e.g. carbon, oxygen, silicon, calcium, iron, can be obtained.

The 100 microsecond cycle illustrated in FIG. 3 is set to enhance the statistical precision of the inelastic scattering gamma ray spectra. But closely spaced neutron bursts have the disadvantage that background gamma rays, resulting in this instance predominantly from thermal neutron capture reactions between formation constituents and neutrons from one or more preceding bursts, will be present during the detection periods for the inelastic scattering gamma rays. Such capture gamma rays will of course be sensed by the near and far detectors and unless compensated for, will tend to confound the inelastic scattering gamma ray spectra.

The counts detected by the near detector 20 and the far detector 22 in spectral gate B of FIG. 3 may be used to correct the inelastic spectra detected in gate A for capture background gamma rays, according to the teaching of U.S. Pat. No. 4,232,220 issued in the name of Russel C. Hertzog and assigned to the assignee of the present application, wherein background spectra for both near and far spectra may be subtracted from the inelastic spectra detected in gate A resulting in new inelastic spectra corrected for background effects. U.S. Pat. No. 4,232,220 is incorporated herein by reference for its disclosure of correcting inelastic spectra with spectra derived from gates immediately following the neutron burst. Furthermore, more details of the sonde 10 can be found in the patent application from McKeon, Roscoe, Stoller already referred to.

According to the teaching from the McKeon, Roscoe and Stoller pending patent application already referred to, the respective yields, as measured, of carbon "C" and oxygen "O", are expressed as follows:

$$C = \alpha + \beta S_o + \delta C_b \qquad (10)$$

$$O = \eta + \mu S_o + \nu C_b \qquad (11)$$

where "$\alpha$, $\beta$, $\delta$, $\eta$, $\mu$, and $\nu$," are coefficients which are determined under laboratory conditions by taking four measurements under the same environmental conditions (such as borehole size) except varying the borehole and formation fluids, i.e. varying $S_o$ and $C_b$, according to the following table:

| Borehole fluid | Formation fluid |
|---|---|
| Water | Water |
| Water | Oil |
| Oil | Water |
| Oil | Oil |

It has to be born in mind that the measurements in the borehole actually include two sets of measurements, one for the near detector and the other for the far detector. Accordingly, each of the hereabove mentioned equations (10) and (11) consists of a set of two equations.

According to the invention, carbon yield C and oxygen yield O are respectively expressed as a linear function of two or more of the following parameters: $S_o$, $S_w$, $C_b$ or $C_o$. The general form of these linear functions is:

$$C = f(S_o, S_w, C_b, C_o) \qquad (12)$$

$$O = g(S_o, S_w, C_b, C_o) \qquad (13)$$

where "$S_w$" is the water saturation or water percentage in the formation pore space, with $S_w = 1 - S_o$, and "$C_o$" is the water percentage in the borehole, with $C_o = 1 - C_b$.

By way of example, C and O can be expressed as follows:

$$C = F_{kc} + F_{cf}S_o + F_{cb}C_b \qquad (12A)$$
$$O = F_{ko} + F_{of}S_w + F_{ob}C_o \qquad (13A)$$

where "$F_{xy}$" are coefficients representative of the environmental parameters affecting the oil saturation and borehole oil fraction; such parameters may e.g. be the borehole diameter, the logging sonde stand-off, the casing diameter. As to coefficients "$F_{xy}$", subscript "o" refers to oxygen, "c" refers to carbon, "b" to borehole, "f" to formation and "k" to a constant. Coefficients "$F_{xy}$" are determined experimentally once and for all under laboratory conditions. Again, equations (12A) and (13A) each include a set of two equations, one for each detector.

When adjusting the equation coefficients to the actual environmental conditions of the measurements, one has to determine the adequate coefficients by extrapolation from the coefficients determined experimentally. In that respect equations (12A) and (13A) provide over equations (10) and (11) a better extrapolation of the coefficients and thus provide coefficients "$F_{xy}$" which constitute a better representation of the actual environment than the "$\alpha$-$\nu$" coefficients of equations (10) and (11).

Furthermore, the invention provides an improved determination of the environmental coefficients "$F_{xy}$" from equations (12A) and (13A) by using the net spectra of the inelastic gamma rays. A set of equations is established for each of the laboratory measurements above referred to:

$$U^j = \Sigma\, y_i A_i^j = F_{kc}A_{cf}^j + F_{cf}S_o A_{cf}^j + F_{cb}C_b A_{cb}^j + F_{ko}A_{of}^j + \qquad (15)$$

$$F_{of}S_w A_{of}^j + F_{ob}O_b A_{ob}^j + \sum_{i>2} y_i A_i^j$$

where $U^j$ corresponds to the number of counts of the j-th channel (or energy window) of the normalized net spectrum of the inelastic gamma rays, "$y_i$" is the yield of the i-th standard element, "$A_i^j$" stands for the number of counts for the j-th channel of the i-th standard, "$A_{cb}$" is the carbon-borehole standard, "$A_{cf}$" is the carbon-formation standard, "$A_{ob}$" is the oxygen-borehole standard, and "$A_{of}$" is the oxygen-formation standard. It has to be understood that each set of equations $U^j$ includes as many equations as channel. By way of example, the number of laboratory measurements is at least three, and preferably four. In one embodiment, one can assume that $A_{of} = A_{cb}$ and $A_{cf} = A_{cb}$. In another embodiment standards for borehole and/or formation can be provided from other sources. The six unknowns "$F_{xy}$" are common to all four set of equations similar to equation (15) and derived from the four laboratory measurements. The four set of equations can be solved for the coefficients "$F_{xy}$" by using a well known weighted least squares method.

Moreover, according to an important aspect of the present invention, it is proposed an improved model for determining the oil $S_o$ and water $S_w$ saturation in the formation and the oil $C_b$ and water $C_o$ saturation in the borehole.

From equations (12A) and (13A) can be derived the following equations (16), (17), (18), and (19), the superscripts "n" and "f" respectively referring to the near detector and the far detector:

$$C^n = F_{kc}{}^n + F_{cf}{}^n S_o + F_{cb}{}^n C_b \tag{16}$$

$$C^f = F_{kc}{}^f + F_{cf}{}^f S_o + F_{cb}{}^f C_b \tag{17}$$

$$O^n = F_{ko}{}^n + F_{of}{}^n S_w + F_{ob}{}^n C_o \tag{18}$$

$$O^f = F_{ko}{}^f + F_{of}{}^f S_w + F_{ob}{}^f C_o \tag{19}$$

From equations 16-19, the carbon and oxygen yields for the near detector ($C^n$ and $O^n$) are combined on the one hand, and the carbon and oxygen yields for the far detector ($C^f$ and $O^f$) are combined on the other hand. The two equations thus obtained are used to solve for the two unknowns $S_o$ and $C_b$.

According to of the invention, $C^n$ and $O^n$ on the one hand, $C^f$ and $O^f$ on the the other hand, are combined so as to form the differences ($C^n - O^n$) and ($C^f - O^f$). These differences can be, according to the invention, expressed in different ways, depending upon the linear functions expressing C and O respectively. By way of example, the differences ($C^n - O^n$) and ($C^f - O^f$) can be expressed as follows, based on equations (16), (17), (18) and (19), and $S_o = 1 - S_w$ and $C_b = 1 - C_o$:

$$C^n - O^n = (F_{kc}{}^n - F_{ko}{}^n - F_{of}{}^n - F_{ob}{}^n) + (F_{cf}{}^n + F_{of}{}^n) S_o + (F_{cb}{}^n + F_{ob}{}^n) C_b \tag{20}$$

$$C^f - O^f = (F_{kc}{}^f - F_{kd}{}^f - F_{of}{}^f - F_{ob}{}^f) + (F_{cf}{}^f + F_{of}{}^f) S_o + (F_{cb}{}^f + F_{ob}{}^f) C_b \tag{21}$$

Alternately, the differences $C - O$ can also be expressed, by using equation (10) and (11):

$$C^n - O^n = (\alpha_n - \eta_n) + (\beta_n - \mu_n) S_o + (\delta_n - \nu_n) C_b \tag{22}$$

$$C^f - O^f = (\alpha_f - \eta_f) + (\beta_f - \mu_f) S_o + (\delta_f - \nu_f) C_b \tag{23}$$

Equations (20) and (21), or (22) and (23) are thus solved for the unknowns $S_o$ and $C_b$.

Forming the difference $C - O$ between carbon and oxygen yields according to the invention, compared to the ratio C/O as it is known in the art (see the U.S. patent application pending already referred to) improves substantially the accuracy and precision of the measurements. As a matter of fact, C and O show variations of similar value magnitude (i.e. around 0.05) and of opposite signs, while O has an absolute value greater (between 0.1 and 0.2) than C (between 0 and 0.05). The difference $C - O$ will enhance the variations of C and O and thus provide more precise and accurate measurements. Furthermore, the data from respective near and far detector are combined in a way to provide a full benefit of using two detectors, as it will be further detailed.

Here below is described another embodiment of the invention, for the determination of $S_o$ and $C_b$, and which constitutes an alternative method to the above described method based on the differences $C^n - O^n$ and $C^f - O^f$.

The measured carbon and oxygen yields (C, O) are expressed in the following matrix form:

$$[U] = [S][y] \tag{24}$$

where [U] represents the measured data as a $2N \times 1$ matrix, "N" being the number of channels or energy windows, including the number of counts detected in each channel; rows 1 to N of the [U] matrix correspond to the near detector while rows $N+1$ to $2N$ correspond to the far detector; [S] includes the standards for the near and far detector in the form of a $2N \times 2n$ block matrix, "n" being the number of elements under investigation, such as carbon, oxygen, silicon, calcium, iron, plus the background:

$$S = \begin{matrix} (S\text{-near}) & O \\ O & (S\text{-far}) \end{matrix} \tag{25}$$

and [y] is a $2n \times 1$ matrix of the unknown element yields (including carbon and oxygen).

Equation (24) in developed form, becomes:

$$\text{(near)} \begin{bmatrix} U_1 \\ U_2 \\ / \\ / \\ U_N \\ U_1 \\ / \\ / \\ U_N \end{bmatrix} = \begin{pmatrix} (S\text{-near}) & O \\ O & (S\text{-far}) \end{pmatrix} \begin{bmatrix} y_1 \\ y_2 \\ / \\ / \\ y_N \\ y_1 \\ / \\ / \\ y_N \end{bmatrix} \tag{26}$$
(far)

Elemental yields "$y_i$", i.e. respectively carbon yield C and oxygen O, are then expressed as a function of $S_o$ and $C_b$, and then introduced in equation (24). To this end, either equations (10), (11) or equations (16)–(19) can be used alternately. The following describes the calculation referring to carbon by using equations (16) and (17). The carbon yields for the near detector "$y_{cn}$" and the far detector "$y_{cf}$" are introduced in equation (24), which thus becomes:

$$[U] - [F_{kc} S_c] = [S_{mod}][y_{mod}] \tag{27}$$

where $[F_{kc} S_c]$ is a $2N \times 1$ matrix composed of near and far detector carbon standards $[S_{cn}]$ and $[S_{cf}]$ which represents the constant carbon contribution which is not due to the borehole fluid or the fluid in the formation pore space, with:

$$[F_{kc} S_c] = F_{kc}{}^n [S_{cn}] + F_{kc}{}^f [S_{cf}] \tag{28}$$

where $[S_{mod}]$ is a matrix including near and far standards and the first two columns of which represent $S_o$ and $C_b$ by changing the variables in the standard matrix [S] of equation (24) from $y_{cn}$ and $y_{cf}$ to $S_o$ and $C_b$. $[S_{mod}]$ matrix is thus a function of $S_o$ and $C_b$ and includes a first standard or variable function $[S_{1,mod}]$ corresponding to $C_b$ and a second standard or variable function $[S_{2,mod}]$ corresponding to $S_o$. The first standard $[S_{1,mod}]$ reads:

$$[S_{1,mod}] = F_{cb}{}^n [S_{cn}] + F_{cb}{}^f [S_{cf}] \tag{29}$$

where $[S_{cn}]$ denotes a matrix including the carbon standard for the near detector and $[S_{cf}]$ is a matrix including the carbon standard for the far detector. The second variable function $[S_{2,mod}]$ corresponding to $S_o$ reads:

$$[S_{2,mod}] = F_{cf}{}^n [S_{cn}] + F_{cf}{}^f [S_{cf}] \tag{30}$$

All the above mentioned calculation (equations 27 to 30) refers to carbon. Similar calculations can be carried out for oxygen in order to provide a first and a second variable function corresponding respectively to $S_w$ (saturation of water in the formation) and to $C_o$ (saturation of water in the borehole fluid).

C and O can also be introduced in equation (24) using equations (10) and (11) (instead of equations 16-19 as hereabove described). Thus, equation (24) becomes:

$$[U] - [\alpha S_o] = [S_{mod}][y_{mod}] \quad (31)$$

and, in a manner similar to the calculation referred to in connection with equations (27)-(30), equation (31) gives:

$$[\alpha S_o] = \alpha_n[S_{cn}] + \alpha_f[S_{cf}] \quad (32)$$

$$[S_{1,mod}] = \delta_n[S_{cn}] + \delta_f[S_{cf}] \quad (33)$$

$$[S_{2,mod}] = \beta_n[S_{cn}] + \beta_f[S_{cf}] \quad (34)$$

Finally, calculations resulting either from equations 27-30 or from equations 31-34, equation (26) can be written as follows:

$$\text{(near)} \begin{bmatrix} U_1 \\ U_2 \\ / \\ / \\ / \\ U_N \\ U_1 \\ / \\ / \\ / \\ U_N \end{bmatrix} \text{(far)} = \quad (35)$$

$$\begin{bmatrix} \begin{pmatrix} C_{b1} & C_{o1} & //// \\ / & / & //// \\ / & / & //// \\ / & / & //// \\ / & / & //// \end{pmatrix} & \begin{matrix} S_{01} & S_{w1} \\ / & / \\ / & / & O \\ / & / \\ / & / \end{matrix} \\ & \begin{pmatrix} / & / & //// \\ / & / & //// \\ / & / & O & / & / & //// \\ / & / & / & / & //// \\ / & / & / & / & //// \\ C_{b2N} & C_{o2N} & S_{o2N} & S_{w2N} //// \end{pmatrix} \end{bmatrix} \begin{bmatrix} C_b \\ C_o \\ / \\ y_{nN} \\ S_o \\ S_w \\ / \\ / \\ / \\ y_{fN} \end{bmatrix}$$

In order to improve further the hereabove described matrix method, and make full use of the available information, one may introduce the following constraints:

$$S_o + S_w = 1 \quad (36)$$

$$C_b + C_o = 1 \quad (37)$$

Equation (35), (36) and (37) can be solved through known mathematical process, such as Lagrange multipliers, (see e.g. "Methoden der Mathematischen Physik" from R. Courant and D. Hilbert, 1968, Springer-Verlag, Heidelberg, page 190) or variable substitution; the latter is preferable since it allows one to reduce the matrix size.

As can be seen from equation (35), and especially from the standard matrix [S], the standards for respectively the near and the far detector are combined or correlated. The matrix method hereabove described and leading to equation (35) provides the same advantages as the method previously described based on the differences C−O, especially by providing additional information resulting from the combination of data from the near and far detector. This allows one to gain full benefit of using two detectors.

As a further comparison between the different embodiments of the invention, the "matrix method" (equation 35) brings a slight advantage over the method based on the differences $C^n - O^n$ and $C^f - O^f$, (equations 20, 21, or 22, 23). As a matter of fact, although both methods allow one to correlate data from near and far detector, the correlation is carried out at a respective step which differs in time from one method to the other. The "difference C−O method" correlates the carbon and oxygen yields C and O which are already processed data, while the matrix method correlates the data issued from the detectors, before any process besides a gain and offset correction and a background subtraction. In other words, the "difference C−O method" uses information from both detectors separately to provide separate carbon and oxygen yields for each detector, which are then combined in order to calculate $S_o$ and $C_b$. In contrast, the matrix method combines or correlates the near and far detectors data at the beginning of the process. Furthermore, it has to be noted that the matrix method does not require one to determine carbon and oxygen yields since the matrix method implies a change of variables in the matrix [S] [y] from the yields $y_{cn}$, $y_{cf}$ to the unknown oil saturations $S_o$ and $C_b$.

Although the above description contemplates the determination of both $S_o$ and $C_b$, the present invention also allows the determination of one unknown, either $S_o$ or $C_b$, assuming the other ($C_b$ or $S_o$) is already available from other sources. This results in an improved precision on the unknown. Furthermore, in this case the measurements can be carried out with a logging tool provided with a single detector. In contrast, two detectors are needed for determining simultaneously both $S_o$ and $C_b$.

What is claimed is:

1. A method for determining the hydrocarbon saturation $S_o$ in an earth formation surrounding a borehole, comprising:

irradiating the formation with a source of neutrons of sufficient energy to interact with atoms of the formation and the borehole, according to inelastic neutron reactions;

detecting and counting the gamma rays resulting from said reactions at at least one location longitudinally spaced from said source;

forming gamma ray spectrum signals from said gamma rays and deriving from said signals the carbon and oxygen yields;

expressing the measured carbon (C) and oxygen (O) yields respectively as a first and second linear function of $S_o$, $S_w$ the water saturation in the formation, $C_b$ the hydrocarbon saturation in the borehole, and/or $C_o$ the water saturation in the borehole;

combining the respective measured carbon and oxygen yields (C, O) so as to form the difference C−O; and solving for the unknown $S_o$ from the difference C−O.

2. A method for determining the hydrocarbon saturation $C_b$ in a borehole surrounded by earth formations, comprising:

irradiating the formation with a source of neutrons of sufficient energy to interact with atoms of the formation and the borehole, according to inelastic neutron reactions;

detecting and counting the gamma rays resulting from said reactions at at least one location longitudinally spaced from said source;

forming gamma ray spectrum signals from said gamma rays and deriving from said signals the carbon and oxygen yields;

expressing the measured carbon (C) and oxygen (O) yields respectively as a first and second linear function of $S_o$ the oil saturation in the formation, $S_w$ the water saturation in the formation, $C_b$ and/or $C_o$ the water saturation in the borehole;

combining the respective measured carbon and oxygen yields (C, O) so as to form the difference C−O; and solving for the unknown $C_b$ from the difference C−O.

3. The method according to claim 1 further comprising the step of introducing in said first and said second linear functions the value of $C_b$ known from another source.

4. The method according to claim 2 further comprising the step of introducing in said first and said second linear functions the value of $S_o$ known from another source.

5. A method for determining the hydrocarbon saturation $S_o$ in an earth formation surrounding a borehole, and the hydrocarbon saturation $C_b$ in said borehole, comprising:

irradiating the formation with a source of neutrons of sufficient energy to interact with atoms of the formation and the borehole, according to inelastic neutron reactions;

detecting and counting the gamma rays resulting from said reactions, at at least two locations longitudinally spaced from said source and including a first location and at a second location, said first location (near) being disposed a distance from said source smaller than said second location (far);

forming gamma ray spectrum signals from said gamma rays and deriving from said signals the carbon and oxygen yields;

expressing the measured carbon (C) and oxygen (O) yields respectively as a first and second linear function of $S_o$, $S_w$ the water saturation in the formation, $C_b$, and/or $C_o$ water saturation in the borehole;

combining the respective carbon and oxygen yields ($C^n$, $O^n$) for the near detector, and the respective carbon and oxygen yields ($C^f$, $O^f$) for the far detector so as to form the differences $C^n - O^n$ and $C^f - O^f$; and solving for the unknowns $S_o$ and $C_b$ from the difference C-O.

6. The method according to claim 1, wherein said first linear function is of the form $$C = F_{kc} + F_{cf}S_o + F_{cb}C_b$$

and said second linear function is of the form
$$O = F_{ko} + F_{of}S_w + F_{ob}C_o$$

where "$F_{xy}$" are coefficients representative of the environmental effects, subscript "k" refer to constant, "c" to carbon, "o" to oxygen, "f" to the formation and "b" to the borehole.

7. The method according to claim 2, wherein said first linear function is of the form $$C = F_{kc} + F_{cf}S_o + F_{cb}C_b$$

and said second linear function is of the form $$O = F_{ko} + F_{of}S_w + F_{ob}C_o$$

where "$F_{xy}$" are coefficients representative of the environmental effects, subscript "k" refer to constant, "c" to carbon, "o" to oxygen, "f" to the formation and "b" to the borehole.

8. The method according to claim 5 wherein said differences are expressed as $$C^n - O^n = (F_{kc}^n - F_{ko}^n - F_{of}^n - F_{ob}^n) + (F_{cf}^n + F_{of}^n)S_o + (F_{cb}^n + F_{ob}^n)C_b$$

$$C^f - O^f = (F_{kc}^f - F_{ko}^f - F_{of}^f - F_{ob}^f) + (F_{cf}^f + F_{of}^f)S_o + (F_{cb}^f + F_{ob}^f)C_b$$

where "$F_{xy}^n$" and "$F_{xy}^f$" are coefficients representative of the environmental effects, and superscripts "n" and "f" respectively refer to the near and the far detecting locations.

9. The method according to claim 5 wherein said differences are expressed as $$C^n - O^n = (\alpha_n - \eta_n) + (\beta_n - \mu_n)S_o + (\delta_n - \nu_n)C_b$$

$$C^f - O^f = (\alpha_f - \eta_f) + (\beta_f - \mu_f)S_o + (\delta_f - \nu_f)C_b$$

where "$\alpha_n, \eta_n, \beta_n, \mu_n, \delta_n, \nu_n, \alpha_f, \eta_f, \beta_f, \mu_f, \delta_f,$ and $\nu_f$" are coefficients representative of the environmental effects, the subscripts "n" and "f" respectively referring to the near and the far detecting locations.

10. A method for determining the hydrocarbon saturation $S_o$ in an earth formation surrounding a borehole, comprising:

irradiating the formation with a source of neutrons of sufficient energy to interact with atoms of the formation or the borehole, according to inelastic neutron reactions;

detecting and counting the gamma rays resulting from said reactions at at least one detecting location longitudinally spaced from said source;

forming gamma ray spectrum signals from said gamma rays and deriving from said signals the carbon and oxygen yields;

expressing each of the measured carbon and oxygen yields (C, O) in the following matrix form:

$$[U] = [S][Y]$$

where [U] is a 2N×1 matrix made of the number of counts detected in each channel or energy window, respectively for the near and the far detector, "N" being the number of channel; [S] is a 2N×2n matrix including the standards for carbon and oxygen, "n" being the number of elements under investigation able to react with said neutrons, and [Y] is a 2n×1 matrix comprising the element yields including the carbon ($Y_c$) and oxygen ($Y_o$) yields;

expressing the carbon and/or oxygen yields as respective functions of $S_o$ and $C_b$; and solving for the unknown $S_o$ from said matrix form.

11. A method for determining the hydrocarbon saturation $C_b$ in a borehole surrounded by earth formation, comprising:

irradiating the formation with a source of neutrons of sufficient energy to interact with atoms of the formation or the borehole, according to inelastic neutron reactions;

detecting and counting the gamma rays resulting from said reactions at at least one detecting location longitudinally spaced from said source;

forming gamma ray spectrum signals from said gamma rays and deriving from said signals the carbon and oxygen yields;

expressing each of the measured carbon and oxygen yields (C, O) in the following matrix form:

$$[U]=[S][Y]$$

where [U] is a 2N×1 matrix made of the number of counts detected in each channel or energy window, "N" being the number of channel; [S] is a 2N×2n matrix including the standards for carbon and oxygen, "n" being the number of elements under investigation able to react with said neutrons, and [Y] is a 2n×1 matrix comprising the element yields including the carbon ($Y_c$) and oxygen ($Y_o$) yields;

expressing the carbon and/or oxygen yields as respective functions of $S_o$ and $C_b$; and solving for the unknown $C_b$ from said matrix form.

12. A method for determining the hydrocarbon saturation $S_o$ in an earth formation surrounding a borehole and the hydrocarbon saturation $C_b$ in said borehole, comprising:

irradiating the formation with a source of neutrons of sufficient energy to interact with atoms of the formation or the borehole, according to inelastic neutron reactions;

detecting and counting the gamma rays resulting from said reactions at at least two detecting locations including a first and a second locations, said first location (near) being disposed longitudinally closer from said source than said second location (far);

forming gamma ray spectrum signals from said gamma rays and deriving from said signals the carbon and oxygen yields;

expressing each of the measured carbon and oxygen yields (C, O) in the following matrix form:

$$[U]=[S][Y]$$

where [U] is a 2N×1 matrix made of the number of counts detected in each channel or energy window, respectively for the near and the far detector, "N" being the number of channel; [S] is a 2N×2n matrix including the standards for carbon and oxygen, for the near and far detector, "n" being the number of elements under investigation able to react with said neutrons, and [Y] is a 2n×1 matrix comprising the element yields including the carbon ($Y_{cn}$, $Y_{cf}$) and oxygen ($Y_{on}$, $Y_{of}$) yields;

expressing the carbon and/or oxygen yields as respective functions of $S_o$ and $C_b$; and solving for the unknowns $S_o$ and $C_b$ from said matrix form.

13. The method according to claim 12 further including:

expressing said equation [U]=[S] [y] as $$[U]-[F_{kc}S_c]=[S_{mod}][y_{mod}]$$

where $[F_{kc}S_c]$ is a matrix composed of near and far detector standard $[S_{cn}]$ and $[S_{cf}]$ which represent the constant carbon contribution which is not due to the borehole fluid or the fluid present in the formation, $$[F_{kc}S_c]=F_{kc}{}^n[S_{cn}]+F_{kc}{}^f[S_{cf}]$$

where subscript "n" and "f" refer respectively to near and far detecting location, $[S_{mod}]$ being a matrix including near and far standards (not including carbon) and which is written as a function of $S_o$ and $C_b$ by changing the variables in the standard matrix [S] from the carbon yields $y_{cn}$, $y_{cf}$ to $S_o$ and $C_b$, and wherein $[S_{mod}]$ matrix includes a first standard or variable function $[S_{1,mod}]$ corresponding to $C_b$ and a second standard or variable function $[S_{2,mod}]$ corresponding to $S_o$, $$[S_{1,mod}]=F_{cb}{}^n[S_{cn}]+F_{cb}{}^f[S_{cf}]$$

where $[S_{cn}]$ denotes a matrix including the carbon standard for the near detector and $[S_{cf}]$ is a matrix including the carbon standard for the far detector, $$[S_{2,mod}]=F_{cf}{}^n[S_{cn}]+F_{cf}{}^f[S_{cf}];$$

and repeating the above steps for oxygen.

14. The method according to claim 12 further including:

expressing said equation [U]=[S][y] as $$[U]-[\alpha S_o]=[S_{mod}][y_{mod}]$$

where $[\alpha S_o]$ is a matrix composed of near and far detectors and representing the constant carbon contribution which is not due to the borehole fluid or the fluid present in the formation, and being expressed as $$[\alpha S_o]=\alpha_n[S_{cn}]+\alpha_f[S_{cf}]$$

$[y_{mod}]$ is a 2n×1 matrix including the carbon/oxygen yields, and $[S_{mod}]$ is a matrix including near and far standards (not including carbon) and which is written as a function of $S_o$ and $C_b$ by changing the variables in the standard matrix [S] from $y_{cn}$ and $y_{cf}$ to $S_o$ and $C_b$; wherein $[S_{mod}]$ matrix includes a first standard or variable function $[S_{1,mod}]$ corresponding to $C_b$ and a second standard or variable function $[S_{2,mod}]$ corresponding to $S_o$, said first standard $[S_{1,mod}]$ is expressed as $$[S_{1,mod}]=\delta_n[S_{cn}]+\delta_f[S_{cf}]$$

where $[S_{cn}]$ denotes a matrix including the carbon standard for the near detector and $[S_{cf}]$ is a matrix including the carbon standard for the far detector; said second variable function $[S_{2,mod}]$ is expressed as $$[S_{2,mod}]=\beta_n[S_{cn}]+\beta_f[S_{cf}];$$

and repeating the above steps for oxygen.

15. The method according to claim 10 wherein $C_b$ is known from another source.

16. The method according to claim 11 wherein $S_o$ is known from another source.

17. A method for determining the hydrocarbon saturation $S_o$ in an earth formation surrounding a borehole, comprising:

irradiating the formation with a source of neutrons of sufficient energy to interact with atoms of the formation and the borehole, according to inelastic neutron reactions;

detecting and counting the gamma rays resulting from said reactions at at least one location longitudinally spaced from said source;

forming gamma ray spectrum signals from said gamma rays and deriving from said signals the carbon and oxygen yields;

expressing the measured carbon (C) and oxygen (O) yields respectively as a first and second linear function of two or more of the following parameters: $S_o$, $S_w$ the water saturation in the formation, $C_b$ the hydrocarbon saturation in the borehole, and/or $C_o$ the water saturation in the borehole;

combining the respective measured carbon and oxygen yields (C, O) according to a given relationship; and solving for the unknown $S_o$ from said relationship.

18. The method according to claim 17, wherein said first linear function is of the form $$C = F_{kc} + F_{cf}S_o + F_{cb}C_b$$

and said second linear function is of the form
$$O = F_{ko} + F_{of}S_w + F_{ob}C_o$$

where "$F_{xy}$" are coefficients representative of the environmental effects, subscript "k" refer to constant, "c" to carbon, "o" to oxygen, "f" to the formation and "b" to the borehole.

19. An apparatus for determining the hydrocarbon saturation $S_o$ in an earth formation surrounding a borehole, comprising:

means for irradiating the formation with a source of neutrons of sufficient energy to interact with atoms of the formation and the borehole, according to inelastic neutron reactions;

means for detecting and counting the gamma rays resulting from said reactions at at least one location longitudinally spaced from said source;

means for forming gamma ray spectrum signals from said gamma rays and deriving from said signals the carbon and oxygen yields;

means for expressing the measured carbon (C) and oxygen (O) yields respectively as a first and second linear function of $S_o$, $S_w$ the water saturation in the formation, $C_b$ the hydrocarbon saturation in the borehole, and/or $C_o$ the water saturation in the borehole;

means for combining the respective measured carbon and oxygen yields (C,O) so as to form the difference C−O; and means for solving for the unknown $S_o$ from the difference C−O.

20. An apparatus for determining the hydrocarbon saturation $C_b$ in a borehole surrounded by earth formations, comprising:

means for irradiating the formation with a source of neutrons of sufficient energy to interact with atoms of the formation and the borehole, according to inelastic neutron reactions;

means for detecting and counting the gamma rays resulting from said reactions at at least one location longitudinally spaced from said source;

means for forming gamma ray spectrum signals from said gamma rays and deriving from said signals the carbon and oxygen yields;

means for expressing the measured carbon (C) and oxygen (O) yields respectively as a first and second linear function of $S_o$ the oil saturation in the formation, $S_w$ the water saturation in the formation, $C_b$ and/or $C_o$ the water saturation in the borehole;

means for combining the respective measured carbon and oxygen yields (C,O) so as to form the difference C−O; and means for solving for the unknown $C_b$ from the difference C−O.

21. The apparatus according to claim 19 further comprising means for introducing in said first and said second linear functions the value of $C_b$ known from another source.

22. The apparatus according to claim 20 further comprising means for introducing in said first and said second linear functions the value of $S_o$ known from another source.

23. An apparatus for determining the hydrocarbon saturation $S_o$ in an earth formation surrounding a borehole, and the hydrocarbon saturation $C_b$ in said borehole, comprising:

means for irradiating the formation with a source of neutrons of sufficient energy to interact with atoms of the formation and the borehole, according to inelastic neutron reactions;

means for detecting and counting the gamma rays resulting from said reactions, at at least two locations longitudinally spaced from said source and including a first location and at a second location, said first location (near) being disposed a distance from said source smaller than said second location (far);

means for forming gamma ray spectrum signals from said gamma rays and deriving from said signals the carbon and oxygen yields;

means for expressing the measured carbon (C) and oxygen (O) yields respectively as a first and second linear function of $S_o$, $S_w$ the water saturation in the formation, $C_b$, and/or $C_o$ water saturation in the borehole;

means for combining the respective carbon and oxygen yields ($C^n$, $O^n$) for the near detector, and the respective carbon and oxygen yields ($C^f$, $O^f$) for the far detector so as to form the differences $C^n - O^n$ and $C^f - O^f$; and means for solving for the unknowns $S_o$ and $C_b$ from the difference C−O.

24. The apparatus according to claim 19, wherein said first linear function is of the form $$C = F_{kc} + F_{cf}S_o + F_{cb}C_b$$

and said second linear function is of the form
$$O = F_{ko} + F_{of}S_w + F_{ob}C_o$$

where "$F_{xy}$" are coefficients representative of the environmental effects, subscript "k" refer to constant, "c" to carbon, "o" to oxygen, "f" to the formation and "b" to the borehole.

25. The apparatus according to claim 20 wherein said first linear function is of the form $$C = F_{kc} + F_{cf}S_o + F_{cb}C_b$$

and said second linear function is of the form
$$O = F_{ko} + F_{of}S_w + F_{ob}C_o$$
where "$F_{xy}$" are coefficients representative of the environmental effects, subscript "k" refer to constant, "c" to carbon, "o" to oxygen, "f" to the formation and "b" to the borehole.

26. The apparatus according to claim 23 wherein said differences are expressed as $$C^n - O^n = (F^n{}_{kc} - F_{ko}{}^n - F_{of}{}^n - F_{ob}{}^n) + (F_{cf}{}^n + F_{of}{}^n)S_o + (F_{cb}{}^n + F_{ob}{}^n)C_b$$

$$C^f - O^f = (F_{kc}{}^f - F_{ko}{}^f - F_{of}{}^f - F_{ob}{}^f) + (F_{cf}{}^f + F_{of}{}^f)S_o + (F_{cb}{}^f + F_{ob}{}^f)C_b$$

where "$F_{xy}{}^n$" and "$F_{xy}{}^f$" are coefficients representative of the environmental effects, and superscripts "n" and "f" respectively refer to the near and the far means for detecting locations.

27. The apparatus according to claim 23 wherein said differences are expressed as $$C^n - O^n = (\alpha_n - \eta_n) + (\beta_n - \mu_n)S_o + (\delta_n - \nu_n)C_b$$

$$C^f - O^f = (\alpha_f - \eta_f) + (\beta_f - \mu_f)S_o + (\delta_f - \nu_f)C_b$$

where "$\alpha_n, \eta_n, \beta_n, \mu_n, \delta_n, \nu_n, \alpha_f, \eta_f, \beta_f, \mu_f, \delta_f,$ and $\nu_f$" are coefficients representative of the environmental effects, the subscripts "n" and "f" respectively referring to the near and the far means for detecting locations.

28. An apparatus for determining the hydrocarbon saturation $S_o$ in an earth formation surrounding a borehole, comprising:
  means for irradiating the formation with a source of neutrons of sufficient energy to interact with atoms of the formation or the borehole, according to inelastic neutron reactions;
  means for detecting and counting the gamma rays resulting from said reactions at at least one means for detecting location longitudinally spaced from said source;
  means for forming gamma ray spectrum signals from said gamma rays and deriving from said signals the carbon and oxygen yields;
  means for expressing each of the measured carbon and oxygen yields (C, O) in the following matrix form:

$$[U] = [S][Y]$$

where [U] is a $2N \times 1$ matrix made of the number of counts detected in each channel or energy window, respectively for the near and the far detector, "N" being the number of channel; [S] is a $2N \times 2n$ matrix including the standards for carbon and oxygen, "n" being the number of elements under investigation able to react with said neutrons, and [y] is a $2n \times 1$ matrix comprising the element yields including the carbon ($Y_c$) and oxygen ($Y_o$) yields;
  means for expressing the carbon and/or oxygen yields as respective functions of $S_o$ and $C_b$; and
  means for solving for the unknown $S_o$ from said matrix form.

29. An apparatus for determining the hydrocarbon saturation $C_b$ in a borehole surrounded by earth formation, comprising:
  means for irradiating the formation with a source of neutrons of sufficient energy to interact with atoms of the formation or the borehole, according to inelastic neutron reactions;
  means for detecting and counting the gamma rays resulting from said reactions at at least one means for detecting location longitudinally spaced from said source;
  means for forming gamma ray spectrum signals from said gamma rays and deriving from said signals the carbon and oxygen yields;
  means for expressing each of the measured carbon and oxygen yields (C, O) in the following matrix form:

$$[U] = [S][Y]$$

where [U] is a $2N \times 1$ matrix made of the number of counts detected in each channel or energy window, "N" being the number of channel; [S] is a $2N \times 2n$ matrix including the standards for carbon and oxygen, "n" being the number of elements under investigation able to react with said neutrons, and [y] is a $2n \times 1$ matrix comprising the element yields including the carbon ($Y_c$) and oxygen ($Y_o$) yields;
  means for expressing the carbon and/or oxygen yields as respective functions of $S_o$ and $C_b$; and
  means for solving for the unknown $C_b$ from said matrix form.

30. An apparatus for determining the hydrocarbon saturation $S_o$ in an earth formation surrounding a borehole and the hydrocarbon saturation $C_b$ in said borehole, comprising:
  means for irradiating the formation with a source of neutrons of sufficient energy to interact with atoms of the formation or the borehole, according to inelastic neutron reactions;
  means for detecting and counting the gamma rays resulting from said reactions at at least two means for detecting locations including a first and a second locations, said first location (near) being disposed longitudinally closer from said source than said second location (far);
  means for forming gamma ray spectrum signals from said gamma rays and deriving from said signals the carbon and oxygen yields;
  means for expressing each of the measured carbon and oxygen yields (C,O) in the following matrix form:

$$[U] = [S][Y]$$

where [U] is a $2N \times 1$ matrix made of the number of counts detected in each channel or energy window, respectively for the near and the far detector, "N" being the number of channel; [S] is a $2N \times 2n$ matrix including the standards for carbon and oxygen, for the near and far detector, "n" being the number of elements under investigation able to react with said neutrons, and [Y] is a $2n \times 1$ matrix comprising the element yields including the carbon ($Y_{cn}, Y_{cf}$) and oxygen ($Y_{on}, Y_{of}$) yields;
  means for expressing the carbon and/or oxygen yields as respective functions of $S_o$ and $C_b$; and
  means for solving for the unknowns $S_o$ and $C_b$ from said matrix form.

31. The apparatus according to claim 30 further including:
  means for expressing said equation $[U] = [S][y]$ as $$[U] - [F_{kc}S_c] = [S_{mod}][y_{mod}]$$

where $[F_{kc}S_c]$ is a matrix composed of near and far detector standard $[S_{cn}]$ and $[S_{cf}]$ which represent the constant carbon contribution which is not due to the borehole fluid or the fluid present in the formation, $$[F_{kc}S_c] = F_{kc}{}^n[S_{cn}] + F_{kc}{}^f[S_{cf}]$$

where subscript "n" and "f" refer respectively to near and far means for detecting location, $[S_{mod}]$ being a matrix including near and far standards (not including carbon) and which is written as a function of $S_o$ and $C_b$ by changing the variables in the standard matrix $[S]$ from the carbon yields $y_{cn}$, $y_{cf}$ to $S_o$ and $C_b$, and wherein $[S_{mod}]$ matrix includes a first standard or variable function $[S_{1,mod}]$ corresponding to $C_b$ and a second standard or variable function $[S_{2,mod}]$ corresponding to $S_o$, $$[S_{19,mod}] = F_{cb}{}^n[S_{cn}] + F_{cb}{}^f[S_{cf}]$$

where $[S_{cn}]$ denotes a matrix including the carbon standard for the near detector and $[S_{cf}]$ is a matrix including the carbon standard for the far detector, $$[S_{2,mod}] = F_{cf}{}^n[S_{cn}] + F_{cf}{}^f[S_{cf}];$$

and
means for repeating the above steps for oxygen.

32. The apparatus according to claim 30 further including:
means for expressing said equation $[U] = [S][y]$ as $$[U] - [\alpha S_o] = [S_{mod}][y_{mod}]$$

where $[\alpha S_o]$ is a matrix composed of near and far detectors and representing the constant carbon contribution which is not due to the borehole fluid or the fluid present in the formation, and being expressed as $$[\alpha S_o] = \alpha_n[S_{cn}] + \alpha_f[S_{cf}]$$

$[y_{mod}]$ is a $2n \times 1$ matrix including the carbon/oxygen yields, and $[S_{mod}]$ is a matrix including near and far standards (not including carbon) and which is written as a function of $S_o$ and $C_b$ by changing the variables in the standard matrix $[S]$ from $y_{cn}$ and $y_{cf}$ to $S_o$ and $C_b$; wherein $[S_{mod}]$ matrix includes a first standard or variable function $[S_{1,mod}]$ corresponding to $C_b$ and a second standard or variable function $[S_{2,mod}]$ corresponding to $S_o$, said first standard $[S_{1,mod}]$ is expressed as $$[S_{1,mod}] = \delta_n[S_{cn}] + \delta_f[S_{cf}]$$

where $[S_{cn}]$ denotes a matrix including the carbon standard for the near detector and $[S_{cf}]$ is a matrix including the carbon standard for the far detector; said second variable function $[S_{2,mod}]$ is expressed as $$[S_{2,mod}] = \beta_n[S_{cn}] + \beta_f[S_{cf}];$$

and
means for repeating the above steps for oxygen.

33. The apparatus according to claim 28 wherein $C_b$ is known from another source.

34. The apparatus according to claim 29 wherein $S_o$ is known from another source.

35. An apparatus for determining the hydrocarbon saturation $S_o$ in an earth formation surrounding a borehole, comprising:
means for irradiating the formation with a source of neutrons of sufficient energy to interact with atoms of the formation and the borehole, according to inelastic neutron reactions;
means for detecting and counting the gamma rays resulting from said reactions at at least one location longitudinally spaced from said source;
means for forming gamma ray spectrum signals from said gamma rays and deriving from said signals the carbon and oxygen yields;
means for expressing the measured carbon (C) and oxygen (O) yields respectively as a first and second linear function of two or more of the following parameters: $S_o$, $S_w$ the water saturation in the formation, $C_b$ the hydrocarbon saturation in the borehole, and/or $C_o$ the water saturation in the borehole;
means for combining the respective measured carbon and oxygen yields (C, O); and
means for solving for the unknown $S_o$ from the difference $C - O$.

36. The apparatus according to claim 35, wherein said first linear function is of the form $$C = F_{kc} + F_{cf}S_o + F_{cb}C_b$$

and said second linear function is of the form $$O = F_{ko} + F_{of}S_w + F_{ob}C_o$$

where "$F_{xy}$" are coefficients representative of the environmental effects, subscript "k" refer to constant, "c" to carbon, "o" to oxygen, "f" to the formation and "b" to the borehole.

37. The method according to claim 6 comprising determining said environmental coefficients "$F_{xy}$" from the net spectra of the inelastic gamma rays, by:
taking at least three laboratory measurements under the same environmental conditions except varying the borehole and the formation fluids;
establishing for each of said laboratory measurements a set of equations, each equation being as follows $$U^j = \Sigma y_i A_i^j = F_{kc}A_{cf}^j + F_{cf}S_o A_{cf}^j + F_{cb}C_b A_{cb}^j + F_{ko}A_{of}^j + F_{of}S_w A_{of}^j + F_{ob}O_b A_{ob}^j + \sum_{i>2} y_i A_i^j$$

where $U^j$ corresponds to the number of counts of the j-th channel (or energy window) of the normalized net spectrum of the inelastic gamma rays, "$y_i$" is the yield of the i-th standard element under investigation and able to react with said neutrons, "$A_i^j$" stands for the number of counts for the j-th channel of the i-th standard, "$A_{cb}$" is the carbon-borehole standard, "$A_{cf}$" is the carbon-formation standard, "$A_{ob}$" is the oxygen-borehole standard, and "$A_{of}$" is the oxygen-formation standard; and
solving for said environmental coefficients $F_{xy}$ said equations.

38. The apparatus according to claim 24 comprising means for determining said environmental coefficients "$F_{xy}$" from the net spectra of the inelastic gamma rays, including:

means for taking four laboratory measurements under the same environmental conditions except varying the borehole and the formation fluids;

means for establishing for each of said laboratory measurements an equation as follows $$U^j = \Sigma y_i A_i^j = F_{kc}A_{cf}^j + F_{cf}S_o A_{cf}^j + F_{cb}C_b A_{cb}^j + F_{ko}A_{of}^j + F_{of}S_w A_{of}^j + F_{ob}O_b A_{ob}^j + \sum_{i>2} y_i A_i^j$$

where $U^j$ corresponds to the number of counts of the j-th channel (or energy window) of the normalized net spectrum of the inelastic gamma rays, "$y_i$" is the yield of the i-th standard element under investigation and able to react with said neutrons, "$A_i^j$" stands for the number of counts for the j-th channel of the i-th standard, "$A_{cb}$" is the carbon-borehole standards, "$A_{cf}$" is the carbon-formation standard, "$A_{ob}$" is the oxygen-borehole standard, and "$A_{of}$" is the oxygen-formation standard; and means for solving for the six unknowns $F_{xy}$ said sets of equations.

* * * * *